(12) United States Patent
Alsberg

(10) Patent No.: US 7,164,452 B2
(45) Date of Patent: Jan. 16, 2007

(54) VEHICLE VIDEO STAND SYSTEM

(76) Inventor: Eric D. Alsberg, 1430 Voltz Rd., Northbrook, IL (US) 60062

( * ) Notice: Subject to any disclaimer, the term of this patent is extended or adjusted under 35 U.S.C. 154(b) by 512 days.

(21) Appl. No.: 10/682,319

(22) Filed: Oct. 9, 2003

(65) Prior Publication Data

US 2005/0078230 A1    Apr. 14, 2005

(51) Int. Cl.
*H04N 5/64* (2006.01)
*B60R 7/00* (2006.01)
*B60N 3/12* (2006.01)
*A47C 7/62* (2006.01)

(52) U.S. Cl. .................. 348/837; 224/275; 224/539; 296/37.8; 296/37.14; 297/188.21; 248/346.07; 248/924

(58) Field of Classification Search ................ 348/837, 348/838; 224/275, 539; 248/346.02, 346.03, 248/346.07, 917–920, 924; 296/188.01, 296/188.21, 37.8, 37.14; D12/30, 415, 426; 297/188.01, 188.21
See application file for complete search history.

(56) References Cited

U.S. PATENT DOCUMENTS

| | | | |
|---|---|---|---|
| 4,097,012 A * | 6/1978 | McIntyre | ................ 248/674 |
| 4,585,196 A | 4/1986 | Cormier | |
| 4,635,110 A | 1/1987 | Weinblatt | |
| 4,843,477 A | 6/1989 | Mizutani et al. | |
| 4,982,996 A | 1/1991 | Vottero-Fin et al. | |
| D328,185 S * | 7/1992 | Harry | ........................ D3/40 |
| 5,338,081 A | 8/1994 | Young et al. | |
| 5,664,714 A | 9/1997 | Navarro et al. | |
| 5,704,527 A | 1/1998 | Struzer | |
| 5,725,189 A | 3/1998 | Landy | |
| 5,822,023 A | 10/1998 | Suman et al. | |
| 6,092,705 A | 7/2000 | Meritt | |
| 6,283,299 B1 * | 9/2001 | Lee | ........................... 206/760 |
| 6,338,429 B1 | 1/2002 | Pesce | |
| 6,719,343 B1 * | 4/2004 | Emerling et al. | ........ 296/24.34 |
| 6,860,415 B1 * | 3/2005 | White | ........................ 224/275 |
| 6,928,654 B1 * | 8/2005 | Tranchina et al. | ............ 725/75 |
| 6,975,806 B1 * | 12/2005 | Lavelle et al. | .................. 386/46 |
| 6,986,447 B1 * | 1/2006 | Truong | ........................ 224/275 |

OTHER PUBLICATIONS

TV Travel Stand, Classic Accessories, Inc. Kent, WA.
TV/VCR Stand, Auto-Shade, L.L.C., Moorpark, CA May 1996.
"Backseat Movies", Larry Armstrong, Business Week Investor; May 26, 2003.

* cited by examiner

*Primary Examiner*—Victor R. Kostak
(74) *Attorney, Agent, or Firm*—Foley & Lardner LLP

(57) ABSTRACT

A television stand in accordance with the principles of the present invention is retained in place by the front seats. In a preferred embodiment, a television stand in accordance with the principles of the present invention fits snugly between the front bucket seats of a vehicle. A television stand in accordance with the principles of the present invention is further retained by the positioning of the bottom plate in between the front bucket seat inner mounting rails. A television stand in accordance with the principles of the present invention is low enough for the vehicle's driver to see over it.

28 Claims, 3 Drawing Sheets

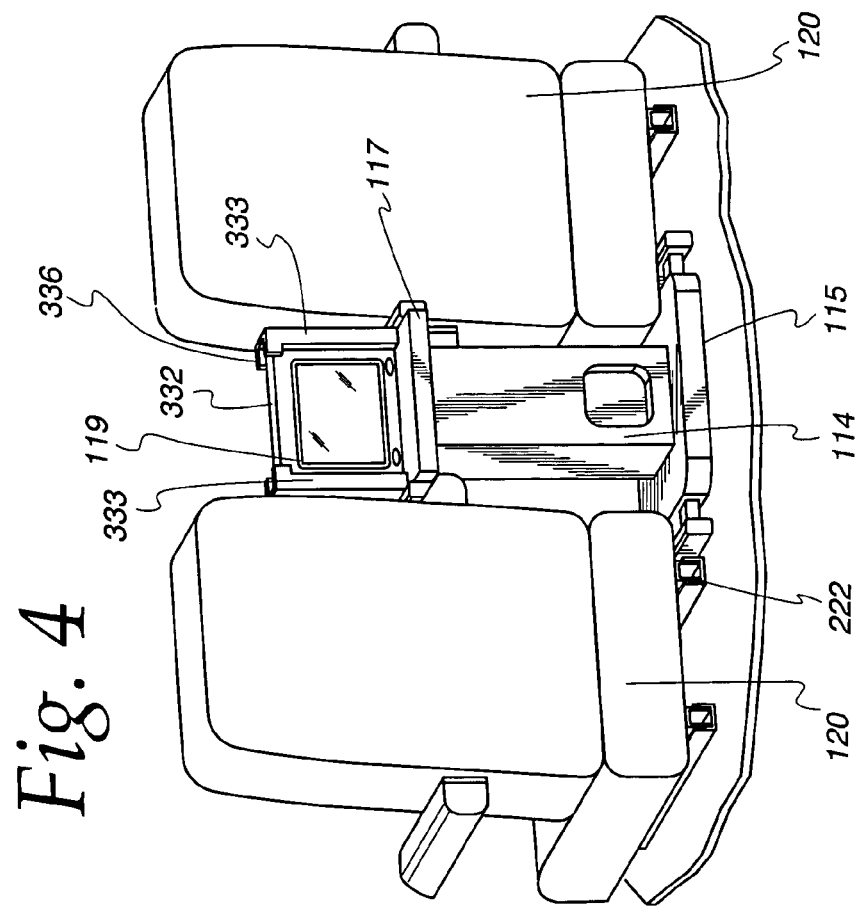
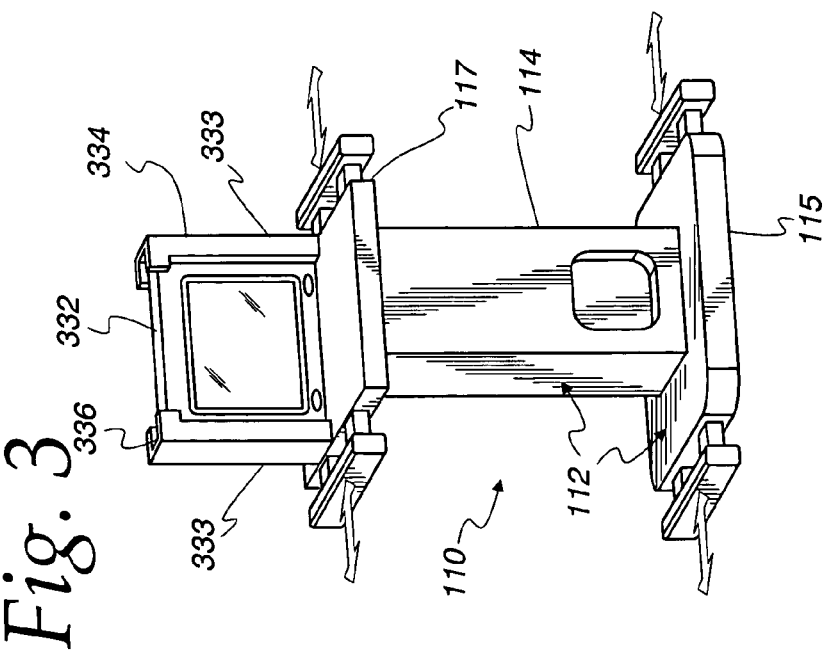

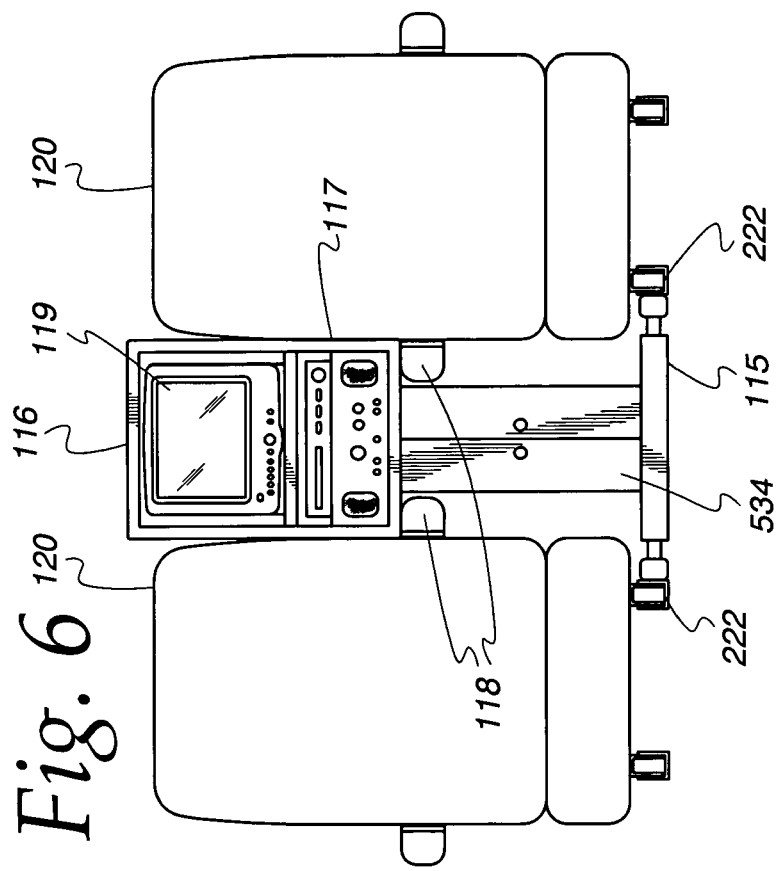
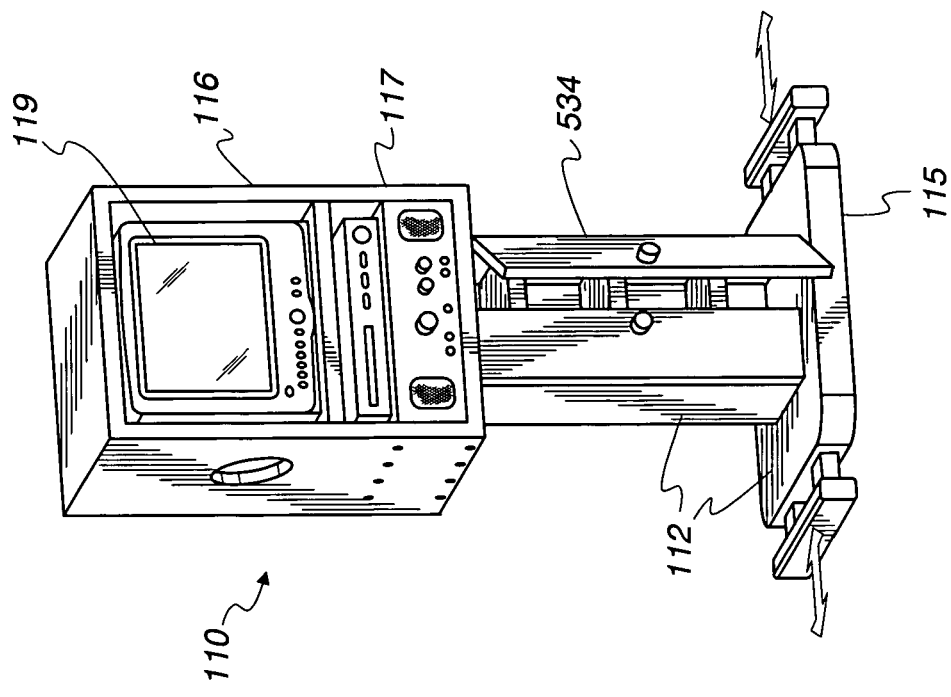

_US 7,164,452 B2_

VEHICLE VIDEO STAND SYSTEM

FIELD OF THE INVENTION

The present invention relates to devices for holding a video unit within a vehicle.

BACKGROUND OF THE INVENTION

Television stands have previously been adapted for use in vehicles as part of an entertainment system. However, in order to achieve integration into the vehicle many systems employ an unwieldy means for fixation. For example, some prior art stands utilize straps and fasteners that attach to the front seats. Yet other designs have utilized removable stands that do not provide the desired level of stability during movement of the vehicle. An additional problem with the prior art designs is that they result in an obtuse or acute viewing angle, which is uncomfortable and often increases the distance from the screen to the viewer. For example, the screen may be too high or too low for optimal viewing, or angled towards the vehicle floor.

Entertainment systems for vehicles are expensive. One factor contributing to the expense is the fact that the video unit is often of a small size and specially made for use in a vehicle. The video display units utilized by most vehicle entertainment systems are small cathode ray tube televisions or liquid crystal display monitors that are under 8 inches in size. In comparison to televisions specially made for vehicles, small cathode ray tube televisions marketed for use in the home are less expensive. Another problem with the presently available entertainment systems for use in a vehicle are that they require permanent installation. Permanent installation is not desired by all customers for a number of reasons, such as an increased likelihood of theft and a limited use of the entertainment system. Each removable video display system can be used outside of the vehicle, for example but not limited to use in a hotel or a home.

Therefore, a need exists for a video display stand that is capable of holding a larger television of the sizes and designs commonly available in the home entertainment market such as a 9-inch cathode ray tube television or a 12-inch liquid crystal display. Such a system should remove easily, yet also provide a high level of stability during vehicle movement as well a comfortable viewing angle.

SUMMARY OF THE INVENTION

A video display stand in accordance with the principles of the present invention is capable of holding a larger video unit of the sizes and designs commonly available in the home entertainment market such as, in one embodiment, a 9-inch cathode ray tube television, or in another embodiment a 12-inch liquid crystal display or a plasma screen television. A video display stand in accordance with the principles of the present invention removes easily, yet also provides a high level of stability during vehicle movement as well a comfortable and optimal viewing angle.

A video display stand in accordance with the principles of the present invention has a base having at least one upright member forming a vertical support tower and a bottom plate. The base may support a housing, preferably via a tray. The tray, or upper plate, helps secure the vehicle video stand system in the vehicle as well as having the video unit housing attached to it.

A video display stand in accordance with the principles of the present invention is retained in place by front seats of a vehicle. In a preferred embodiment, a video stand in accordance with the principles of the present invention fits snugly between the front bucket seats of a vehicle, because the tray's width is such that it rests firmly against the side of each of the front bucket seats and it is further retained by the positioning of the bottom plate in between the front bucket seat inner mounting rails. Therefore, the video display stand does not need any additional means for attachment such as bolts or the like. Both the bottom plate and the tray may be adjustable to allow the bottom plate and the tray to increase or decrease in width so as to contact the sides of the inner mounting rails and the front bucket seats respectively in vehicles of various sizes.

A video stand in accordance with the principles of the present invention is low enough for the vehicle's driver to see over it. In addition, it does not obstruct the driver's use of the vehicle's rearview mirror. The vehicle video stand system provides an easily removable video system for a vehicle with relatively large video display unit optimally positioned and angled for viewing by passengers in the vehicle rear row or rows of seats.

BRIEF DESCRIPTION OF THE DRAWINGS

FIG. 3 is a perspective view of an alternative embodiment of a housing in accordance with the principles of the present invention.

FIG. 4 is a perspective view of one embodiment of a video display stand placed in a vehicle in accordance with the principles of the present invention.

FIG. 5 is a perspective view of another alternative embodiment of the base in accordance with the principles of the present invention.

FIG. 6 is a perspective view of one embodiment of a video display stand placed in a vehicle in accordance with the principles of the present invention.

DETAILED DESCRIPTION OF THE PREFERRED EMBODIMENTS

Figure 2:
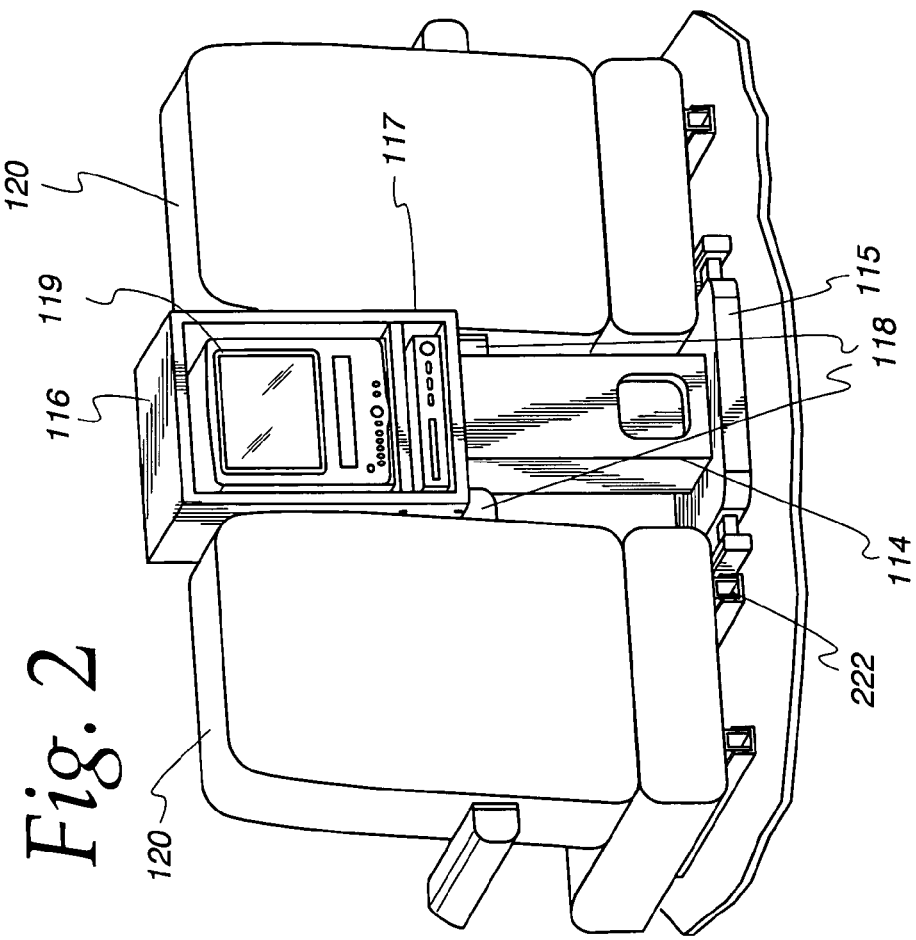
FIG. 2 is a perspective view of one embodiment of a housing in accordance with the principles of the present invention.

A video display stand in accordance with the principles of the present invention provides an easily removable video display stand that fits snugly between the front seats 120 of a vehicle. The stand 110 has a base 112 that supports a housing 116 and may be removably mounted at the floor level of the vehicle. The base 112 may be configured in any shape allowed by the size of the space between the front bucket seats. The housing 116 may be further supported by a tray 117 positioned between the housing 116 and the base.

Figure 1:
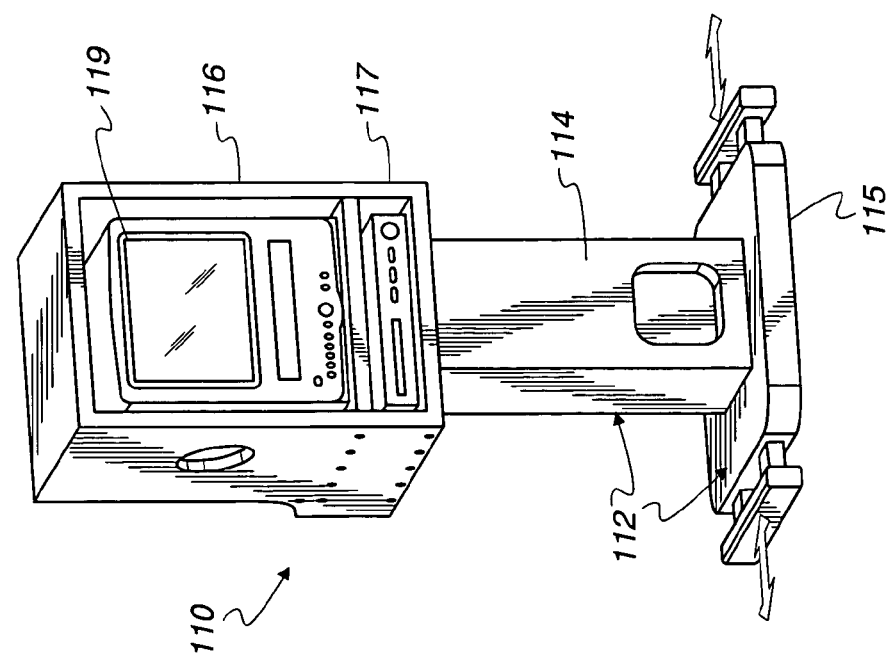
FIG. 1 is a perspective view of one embodiment of a video display stand in accordance with the principles of the present invention.

In a preferred embodiment, the base 112 consists of upright members 114 and a bottom plate 115. However, in a further preferred embodiment shown in FIG. 1, the base 112 is constructed of four rectangular upright members 114. The upright members 114, which are substantially perpendicular to the long axis of the vehicle, are designed to provide access to the interior space such as by use of hinged doors 534 (shown in FIG. 5 and FIG. 6). In a preferred embodiment, the upright members 114 are designed to allow a housing 116 to be positioned over the arm rests 118 of the vehicle. Preferably, the upright members 114 are between about 18½ inches (47.0 cm) and about 20½ inches (52.1 cm).

The bottom plate 115 is substantially of the same width as the space between front bucket seat inner mounting rails 222 so as to provide force to each edge of the bottom plate 115 to secure it in place. In a preferred embodiment, the bottom plate 115 has a width between about 11 inches (27.9 cm) and about 16 inches (40.6 cm). The stand is low enough for the vehicle's driver to see over it.

A tray 117 may be positioned between the base 112 and the housing 116 to support the video display unit. In one embodiment the tray 117 is substantially parallel to the bottom plate 115, but in other embodiments the tray 117 may be angled to provide for a better viewing angle. The tray 117 may constitute an integral part of the base 112 or the housing.

The housing 116 is designed to allow a video display unit of the desired size to be disposed substantially within it. In one embodiment shown in FIGS. 1, 2, 5, and 6, the housing 116 is adapted to receive a substantially cubic monitor or television 119 disposed within the housing 116. In this embodiment, the housing 116, in one embodiment together with the tray 117, forms a polyhedral, preferably a cube. The video display can be, for example but not limited to, a monitor or television 119, such as a cathode ray tube television, a plasma screen, or a liquid crystal display. In one embodiment, the housing 116 is of a size capable of holding a standard 9-inch television disposed within. In an alternative embodiment, the housing 116 is of a size capable of holding a television and one or more video output devices, such as but not limited to DVD players, VCR's or video game consoles. The width of the tray 117 is such that it is substantially equal to the distance between the interior sides of the two front bucket seats 120. In a preferred embodiment the housing 116 is between about 12 inches (30.48 cm) and about 15 inches (38.10 cm) wide. In one embodiment, the front bucket seats 120 exert a force on the side surface of the housing 116 to retain the stand 110.

In an alternative embodiment shown in FIG. 3, the video stand 110 is adapted to receive a video display unit that is essentially a thin rectangular prism, such as but not limited to liquid crystal displays and plasma displays. In this embodiment, the housing 334 comprises two upright arms 333 which are adapted to receive and removably retain the video unit 332. The upright arms 333 are spaced apart so as to allow the video unit 332 to be disposed between them. In a preferred embodiment, the upright arms 333 each include a channel 336 of sufficient width and depth to allow the video unit 332 to be slid into position, wherein the left and right edges of the video unit are located within the channels 336 and the video unit 332 is held substantially upright. When the video display unit is located within the channels 336 of each upright arm 333, the video display unit 332 is held snugly in place. Further, in one embodiment, the distance between the upright arms 333 is adjustable so as to allow for video display units of varying sizes to be held snugly by the upright arms 333. For example, the arms can be attached to the tray 117 using an adjustable ratcheting mechanisms to allow adjustment of the distance between the upright arms 333.

As shown in FIG. 4, when the front seats 120 are positioned an equal distance from the front of the vehicle, the forces exerted by each of the front bucket seats 120 is equal and opposite, thus securely holding the stand 110 in place via normal and frictional forces. When one of the front seats 120 is moved forward or backward on its mounting rails, a torque is exerted on the stand. When this occurs, the stand 110 is prevented by the bottom plate 115 from substantially moving. The bottom plate 115 resists the torque by exerting normal force on the inner front seat mounting rails 222. Thus, the present invention functions regardless of the positioning or movement of the seats.

The positioning of the housing 116 and the bottom plate 115 in such a manner allows for the stand 110 to be easily installed and removed without the use of tools. In a preferred embodiment, the widths of the tray 117 and the bottom plate 115 are adjustable so as to ensure a snug fit between the seats 120 of various size vehicles. In one embodiment, the tray 117 and the bottom plate 115 are adjustable through the use of a scissor-like apparatus. The scissors frame is constructed of a pair of crossed legs consisting of two side portions connected by a crossbar. The legs are joined at the center of each side portion at pivot joints. Each such joint is constructed of a pair of coaxial cylinders, one leg of the scissors frame passing through each cylinder, the cylinders independently rotatable about a pin passing through the common axis. The frame contains two scissors joined, one at each side of the tray 117 and/or housing, operating in unison and utilizing a retaining means, such as a pin, to remain at a desired position. One of ordinary skill in the art will appreciate that any means for allowing the video display stand to have an adjustable width so as to fit snuggly between the front seats of a vehicle is within the scope of the present invention.

In one embodiment, the video display stand 110 can contain fastening members for releasably securing the video display stand 110 to the vehicle. In a preferred embodiment, the housing 116 contains attachment members for releasably securing the video display unit and/or the video output device to the housing. Such attachment members may be integral components of the housing 116 or separate pieces. The display unit is connected to a video output device such as but not limited to a video cassette recorder (VCR), a digital video disc (DVD) player, a video game console, or a computer. The video output device may be an integrated part of the video display unit, such as a combination TV/VCR. Alternatively, the video output device may be a separate component disposed within in the housing 116 or within the base. Additionally, in a preferred embodiment, the video display stand 110 may have power outlet plugs integrated into the stand, separate from the stand 110 or both.

In one embodiment, additional features of the stand 110 include storage compartments, drink holders, and a cordless headphone system or plugs for multiple headphone jacks. The housing 116 may be adapted to contain audio output devices such as headphones or speakers. The stand 110 may be made of a wide variety of materials. Preferably, any strong durable material that is not overly hard, such as for example low density polyethylene (LDPE) resins. The video display unit is easily removed from the video display stand 110 and the video display stand 110 is easily removed from the vehicle. Slight variations in the size of the stand 110 would accommodate various vehicle makes and models.

While the invention has been described with specific embodiments, other alternatives, modifications and variations will be apparent to those skilled in the art. All such alternatives, modifications and variations are intended to be included within the spirit and scope of the appended claims.

What is claimed is:

1. A video display stand comprising:
   a base having at least one upright member and a bottom plate;
   a tray supported by the base;

the tray having a means to retain a video display unit; and a means for releasably securing the video display stand between front seats of a vehicle, wherein the bottom plate has an adjustable width.

2. The video display stand of claim 1 further wherein the releasable securing means is the frictional and normal forces between the front seats and the tray.

3. The video display stand of claim 1 further wherein the releasable securing means is the normal force between front seat mounting rails and the bottom plate.

4. The video display stand of clam 1 further wherein the video unit is a cathode ray television.

5. The video display stand of clam 4 further wherein is a 9-inch television.

6. The video display stand of claim 1 further wherein the base has four upright members.

7. The video display stand of claim 1, wherein the tray further comprises two upright members each having a channel whereby the video display unit is removably retained by the channels.

8. The video display stand of claim 1, wherein the video display unit comprises a liquid crystal display.

9. The video display stand of claim 1, wherein the housing has a polyhedral shape.

10. The video display stand of claim 1, wherein the tray has an adjustable width.

11. A video display stand for displaying a video display unit in a vehicle, the system comprising:

a base having a bottom plate and at least one upright member;

a tray supported by the base;

a housing supported by the tray and capable of receiving a video display unit disposed within it, wherein the video display stand is retained in place by frictional forces between a first front seat and a second front seat of a vehicle and the housing.

12. The video display stand of clam 11, wherein the base has four upright members.

13. The video display stand of clam 11, wherein the video unit is a cathode ray tube television.

14. The video display stand of clam 13, further wherein is a 9-inch television.

15. The video display stand of claim 11, wherein the video display unit comprises a liquid crystal display.

16. The video display stand of claim 11, wherein the tray has a means for adjusting the width of the tray.

17. The video display stand of claim 11, wherein the bottom plate has a means for adjusting the width of the tray.

18. A video display stand adapted to be removably secured to a vehicle, the stand comprising:

a base having a bottom plate and at least one upright member;

a housing supported by the base, the housing adapted to support a video unit and the video display unit being further adapted to be retained by front seats of a vehicle, wherein the video display unit is retained by the force between front seat mounting rails and the bottom plate.

19. The video display stand of claim 18, wherein the bottom plate has an adjustable width.

20. The video display stand of claim 18, wherein the video display unit comprises a cathode ray television.

21. The video display stand of claim 18, wherein the video display unit comprises a liquid crystal display.

22. The video display stand of claim 18 further comprising a tray positioned between the housing and the base.

23. The video display stand of claim 18 further comprising a means for releasably securing the video display stand.

24. The video display stand of claim 23, wherein the releasable securing means is the forces between the front seats and the video display stand.

25. The video display stand of claim 18, wherein the housing has a polyhedral shape.

26. The video display stand of claim 18, wherein the housing is held in place by forces between the front seats and the housing.

27. The video display stand of claim 18, wherein the housing comprises two upright members each having a channel whereby the video display unit is removably retained by the channels.

28. The video display stand of claim 27, wherein the two upright members have a means for adjusting the distance between the two upright members.

* * * * *